US012768944B2

(12) United States Patent
Westerhoff et al.

(10) Patent No.: US 12,768,944 B2
(45) Date of Patent: Oct. 20, 2026

(54) METHOD FOR DETERMINING A PITCH ANGLE

(71) Applicant: Aptiv Technologies AG, Schaffhausen (CH)

(72) Inventors: Jens Westerhoff, Bochum (DE); Rakesh Akkineni, Bengaluru (IN)

(73) Assignee: Aptiv Technologies AG, Schaffhausen (CH)

( * ) Notice: Subject to any disclaimer, the term of this patent is extended or adjusted under 35 U.S.C. 154(b) by 169 days.

(21) Appl. No.: 18/892,989

(22) Filed: Sep. 23, 2024

(65) Prior Publication Data

US 2025/0138147 A1 May 1, 2025

(30) Foreign Application Priority Data

Oct. 30, 2023 (EP) .................................... 23206795

(51) Int. Cl.
*G01S 7/40* (2006.01)
*G01S 13/931* (2020.01)

(52) U.S. Cl.
CPC .......... *G01S 7/4034* (2021.05); *G01S 13/931* (2013.01); *G01S 2013/9323* (2020.01); *G01S 2013/93271* (2020.01)

(58) Field of Classification Search
None
See application file for complete search history.

(56) References Cited

U.S. PATENT DOCUMENTS 5,877,680 A * 3/1999 Okuchi .................. B60Q 1/115 362/464
6,026,353 A * 2/2000 Winner ................. G01S 13/931 702/183
6,183,118 B1 * 2/2001 Toda ...................... B60Q 1/115 362/465
6,193,398 B1 * 2/2001 Okuchi .................. B60Q 1/115 362/465
6,278,912 B1 * 8/2001 Amano ............ B60G 17/01908 701/1
8,344,940 B2 * 1/2013 Jeong .................... G01S 7/4026 342/75
9,527,509 B2 * 12/2016 Kwon ................... G01S 13/931
10,126,410 B2 * 11/2018 Treptow ................ G01S 13/931
11,874,364 B2 * 1/2024 Sahara .................. G01S 13/931

(Continued)

OTHER PUBLICATIONS

Extended European Search Report regarding European Patent Application No. 23206795.9, dated Apr. 26, 2024.

*Primary Examiner* — Bernarr E Gregory
(74) *Attorney, Agent, or Firm* — Harness, Dickey & Pierce, P.L.C.

(57) ABSTRACT

A method is provided for determining a pitch angle of a perception system of a vehicle with respect to a road surface on which the vehicle is located. Via the perception system, road perception information is detected from the road surface, and object perception information is detected from objects being different from the road surface. A primary pitch angle is determined by using the road perception information, and a relative pitch angle is determined by using the object perception information. The primary pitch angle and the relative pitch angle are combined in order to determine a final pitch angle of the perception system.

13 Claims, 6 Drawing Sheets

(56) References Cited

U.S. PATENT DOCUMENTS

| | | | | |
|---|---|---|---|---|
| 2006/0176214 | A1* | 8/2006 | Nakagawa ............ | G01S 7/4026<br>342/174 |
| 2016/0161597 | A1 | 6/2016 | Treptow et al. | |
| 2023/0008853 | A1 | 1/2023 | Kondo et al. | |
| 2024/0425062 | A1* | 12/2024 | Bang ..................... | B60W 10/04 |

* cited by examiner

METHOD FOR DETERMINING A PITCH ANGLE

CROSS-REFERENCE TO RELATED APPLICATIONS

This application claims the benefit and priority of European patent application number EP 23206795.9, filed on Oct. 30, 2023. The entire disclosure of the above application is incorporated herein by reference.

FIELD

This section provides background information related to the present disclosure which is not necessarily prior art.

The present disclosure relates to a computer implemented method for determining a pitch angle of perception system of a vehicle with respect to a road surface on which the vehicle is located.

BACKGROUND

For autonomous vehicles and vehicles using advanced driver assistance systems (ADAS), it is mandatory to understand the external environment of the vehicle in its entirety in a proper manner. For monitoring the external environment of such a vehicle, perception systems are used which may include radar systems, Lidar systems and/or cameras.

An important task for such perception systems, e.g. by using a radar sensor, is the assessment of the height of potentially dangerous objects. Based on data provided e.g. by the radar sensor, an elevation angle of such an object is usually estimated with respect to the radar sensor, i.e. in a radar coordinate system, in order to determine the height of the object. However, for determining the correct height of the object with respect to a ground level, i.e. with respect to the road surface on which the vehicle is currently located, a spatial transformation is required between the radar coordinate system and a ground coordinate system having its origin on ground level.

Moreover, in order to provide correct height information of objects detected in the external environment of the vehicle via e.g. the radar sensor with respect to the ground level or road surface, a pitch angle of the perception system, e.g. of the radar sensor, relative to the road surface needs to be known. When the vehicle is driving, the pitch angle of the perception system mounted on the vehicle strongly depends on the dynamics of the vehicle. For example, an acceleration or critical braking maneuvers may lead to a change of 2° or more for the pitch angle of the vehicle and, accordingly, of the perception system installed thereon. Such a change of the pitch angle may cause an error when determining the height of the object which may be proximately 3.5 m for a distance of 100 m for the object with respect to the vehicle.

Accordingly, there is a need to have a method being able to determine a current pitch angle of a vehicle with high accuracy.

SUMMARY

This section provides a general summary of the disclosure, and is not a comprehensive disclosure of its full scope or all of its features.

The present disclosure provides a computer implemented method, a computer system, a vehicle and a non-transitory computer readable medium according to the independent claims. Embodiments are given in the subclaims, the description and the drawings.

In one aspect, the present disclosure is directed at a computer implemented method for determining a pitch angle of a perception system of a vehicle with respect to a road surface on which the vehicle is located. The perception system is configured to detect perception information from an external environment of the vehicle. Via the perception system, road perception information is detected from the road surface, and object perception information is detected from objects being different from the road surface. Via a processing unit of the vehicle, the following steps are performed according to the method: a primary pitch angle is determined by using the road perception information, a relative pitch angle is determined by using the object perception information, and the primary pitch angle and the relative pitch angle are combined in order to determine a final pitch angle of the perception system.

The perception system of the vehicle may include a radar system, a Lidar system and/or a camera system. For a radar system, the perception information may include radar detections provided as points in spherical coordinates including an azimuth angle, an elevation angle and a range which may be obtained by a transformation of signals received via one or more radar sensors of the radar system.

For detecting the road perception information, an area or a region of interest may be predefined on the road surface, e.g. in front of the vehicle. The road perception information may be detected within this area or region only. Additionally, an expected intensity or energy range may be defined for the road perception information.

The object perception information may be detected from objects which are not located on the road surface, i.e. having position being different from the road surface. The road perception information may be distinguished from the object perception information based on an energy level or intensity of the signals received from the detected objects. For example, the intensity or energy of signals received from objects which are not located on the road surface may be far outside (e.g. highly above) the expected intensity or energy received from the road surface.

Since the road perception information and the object perception information is detected repeatedly during the operation of the vehicle, i.e. when the vehicle is driving, the final pitch angle of the vehicle is determined for every time step during the operation of the vehicle dynamically. In other words, the final pitch angle may be renewed for every time step when the vehicle is driving.

Therefore, the assessment of the height of potentially dangerous objects which may occur close to the vehicle may be strongly supported by the dynamical determination of the current pitch angle of the perception system. Hence, the reliability of the height assessment may be improved.

The primary pitch angle may be determined based on a measured elevation angle of a certain portion of the road surface, i.e. for the predefined region of interest, and based on an expected elevation angle for this portion of the road surface. The measured elevation angle may be determined by using standard angle finding procedures, e.g. as an angle from range rate or via a spectrum estimation over the antennas for a radar system, which may be applied to e.g. road radar detections.

The expected elevation angle may be determined via a range or distance of the portion of the road surface with respect to the perception system and via a known mounting height of the perception system on the vehicle. The range or distance of the portion of the road surface may also be determined based on the road perception information detected by the perception system. The measured elevation angle determined by the angle finding procedure may be subtracted from the expected elevation angle in order to provide the primary pitch angle.

The relative pitch angle may be determined as a mean value of angles of a plurality of objects with respect to the perception system. These angles may also be determined via standard angle finding procedures and for two or more different time steps. The relative pitch angle may be determined based on angle differences for at least two of these different time steps. Besides, a pitch angle rate (i.e. a pitch angle difference per time) may be determined by dividing the relative pitch angle by the time interval between two different time steps.

If the road in front of the vehicle is blocked or has a low reflectivity, the road perception information being used for determining the primary pitch angle may include a high uncertainty, e.g. a low signal-to-noise ratio, leading to a high variance of the primary pitch angle. In this case, combining the primary pitch angle and the relative pitch angle may still provide a reliable value for the final pitch angle. For example, the relative pitch angle may be provided with a higher weight when being combined with the primary pitch angle if a high variance of the primary pitch angle occurs. Therefore, the method may provide suitable values for the final pitch angle of the perception system even in case of road perception information having a low reliability.

According to an embodiment, the primary pitch angle and the relative pitch angle may be combined via a recursive filter. The recursive filter may be provided with a specific input in order to weight the primary pitch angle and the relative pitch angle with respect to each other when determining the final pitch angle of the vehicle. This specific input may rely on respective uncertainties or variances derived from signals which may be provided by the perception system when detecting the road perception information and the object perception information. Therefore, the reliability of the final pitch angle may be improved by using the recursive filter for combining the primary pitch angle and the relative pitch angle.

Accordingly, a first variance may be calculated for the primary pitch angle, and a second variance may be calculated for a raw pitch angle which may be determined based on the object perception information and which may be used for determining the relative pitch angle or the pitch angle rate. An input for the recursive filter may include the first variance and the second variance.

By providing the first and second variances, dynamical uncertainty measures may be provided to the recursive filter regarding the primary pitch angle and the relative pitch angle or pitch angle rate. The weighting between the primary pitch angle and the relative pitch angle for determining the final pitch angle may be performed by the recursive filter based on the first variance and the second variance. For example, the recursive filter may "shift" the determination of the final pitch angle from mainly applying the primary pitch angle to mainly applying the relative pitch angle if the first variance for the primary pitch angle strongly increases, e.g. due to a decreasing quality of the road perception information. By this means, the continuous and reliable determination of the final pitch angle may be achieved.

Moreover, a confidence value may be determined for the final pitch angle by applying the recursive filter. The confidence value may be used as an uncertainty measure when the height of potentially dangerous objects may be assessed. The confidence value may depend on the first variance calculated for the primary pitch angle and on the second variance calculated for the raw pitch angle of objects being not located on the road surface. Therefore, the recursive filter may provide a reliable confidence value based on the uncertainty or variance of the detected input signals, i.e. of the road perception information and of the object perception information.

The recursive filter may include a Kalman filter, and a measurement vector of the Kalman filter may include the primary pitch angle and the relative pitch angle. Using a Kalman filter may require a quite low computational effort. Moreover, the Kalman filter may be provided with respective variances for the primary pitch angle and the relative pitch angle constituting the measurement vector. These variances may be used as weights by the Kalman filter in order to favor either the primary pitch angle or the relative pitch angle when determining the final pitch angle.

A region of interest may be predefined on the road surface in front of the vehicle. The road perception information may be determined by using detections received from the region of interest only via the perception system. If the perception system includes a radar system, such a region of interest may be defined at a range of 5 to 10 m in front of the vehicle, for example, wherein a lateral extension of the region of interest may be approximately 2 m, for example. Alternatively, such a region of interest may extend from the vehicle up to a certain distance. The region of interest may also be used for distinguishing the road perception information from the object perception information determined for objects being different from road surface.

According to a further embodiment, the perception system may include a radar system. The road perception information may include road radar detections received from the road surface, and the object perception information may include object radar detections received from stationary objects being different from the road surface in the external environment of the vehicle. The objects may be located at positions outside of the region of interest as described above.

Since a range rate may also be determined for the objects based on the radar detection of the radar system, objects may be selected as stationary objects and considered by the method only if their range rate compensated by the speed of the vehicle, i.e. the ego vehicle on which the radar system is installed, is close to zero. By using stationary objects only when determining the object radar detections for estimating the relative pitch angle, the reliability of the relative pitch angle and the final pitch angle may be improved.

A respective measured angle, e.g. an elevation angle, may be determined for each of the road radar detections within a region of interest on the road surface, and a respective theoretical or expected angle may be determined based on a respective measured range or distance of each of the road radar detections with respect to the radar system and based on a mounting height of the radar system. The primary pitch angle may be determined based on at least one difference between the respective measured angle and the respective theoretical or expected angle.

The respective measured angle may be determined for each of the road radar detections by applying a standard angle finding procedure like angle from range rate, Fourier transform techniques or an iterative adaptive approach (IAA). The respective theoretical or expected angle may correspond to the respective measured angle being determined for the same radar detection. The theoretical angle may represent the elevation angle for the region of interest which may be expected if the pitch angle of the vehicle and of the radar system with respect to the road surface is approximately zero. This may be the case, for example, if no acceleration and no braking maneuver are applied to the vehicle.

Hence, the theoretical angle corresponding to a pitch angle of approximately zero may be subtracted from the actual measured angle for the current time step in order to provide the primary pitch angle of the radar system. Therefore, estimating the primary pitch angle may require a low computational effort.

The primary pitch angle may be determined by estimating a mean value of respective differences between the measured angle and the theoretical angle determined for a plurality of road radar detections. Similarly, the relative pitch angle may be determined based on at least one mean value of raw pitch angles determined for a plurality of object radar detections from stationary objects. In addition, the relative pitch angle may be determined by a difference of at least two mean values of raw pitch angles determined for at least two different time steps. Using mean values which may be based on a plurality of radar detections may improve the reliability of the primary pitch angle and of the relative pitch angle and therefore the reliability of the final pitch angle.

In another aspect, the present disclosure is directed at a computer system, said computer system being configured to receive road perception information and object perception information from a perception system of a vehicle and to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

As used herein, terms like processing unit and module may refer to, be part of, or include an Application Specific Integrated Circuit (ASIC), an electronic circuit, a combinational logic circuit, a Field Programmable Gate Array (FPGA), a processor (shared, dedicated, or group) that executes code, other suitable components that provide the described functionality, or a combination of some or all of the above, such as in a system-on-chip. The processing unit may include memory (shared, dedicated, or group) that stores code executed by the processor.

In another aspect, the present disclosure is directed at a vehicle including a perception system and the computer system as described above.

According to an embodiment, the perception system of the vehicle may include a radar system. The radar system may include a front radar sensor which may be configured to provide the road perception information and the object perception information. For performing the method as described above, the front radar sensor may therefore be required only. Hence, determining the final pitch angle according to the method may be entailed with low requirements regarding the hardware to be installed on the vehicle.

According to a further embodiment, the vehicle may further comprise a control unit which may be configured to receive the final pitch angle from the computer system as described above. The control unit may be further configured to apply the final pitch angle when determining a height of an object located in the external environment of the vehicle. The actual final pitch angle which is determined for the current time step by the method as described above may therefore improve the reliability when determining the height of a possibly dangerous object via the control unit.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments and functions of the present disclosure are described herein in conjunction with the following drawings, showing schematically:

Corresponding reference numerals indicate corresponding parts throughout the several views of the drawings.

DETAILED DESCRIPTION

Example embodiments will now be described more fully with reference to the accompanying drawings.

Figure 1:
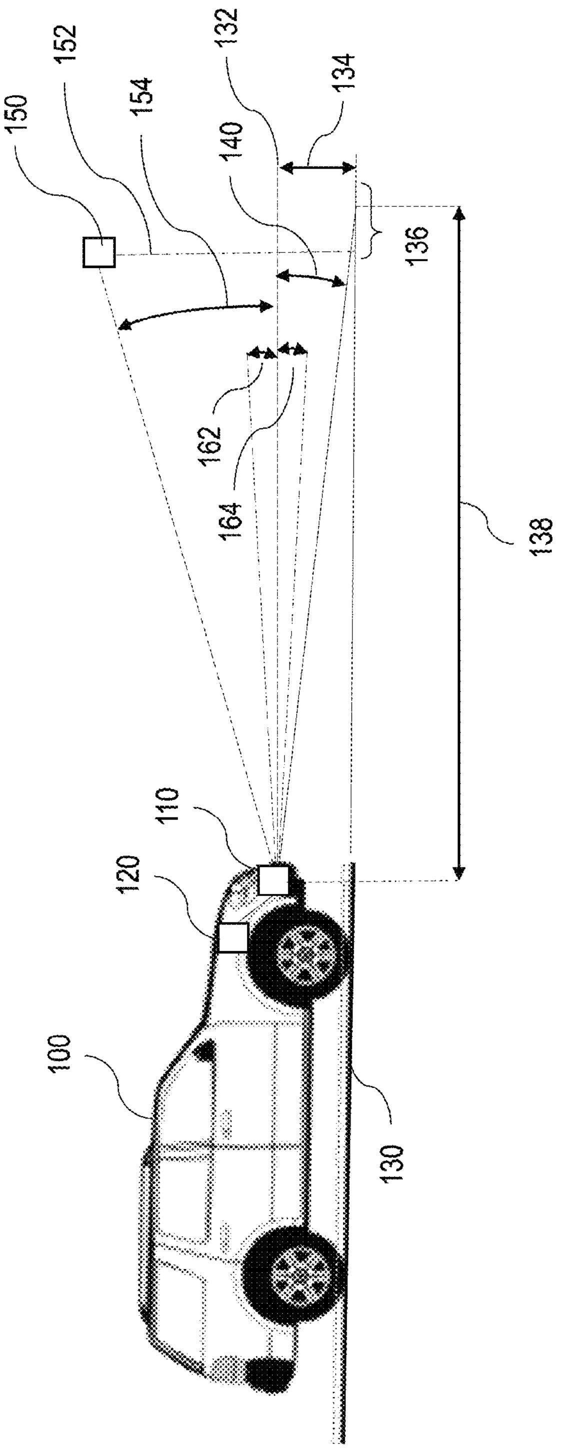
FIG. 1 is an illustration of a vehicle including a perception system and a processing unit.

FIG. 1 schematically depicts an illustration of a vehicle 100 which includes a perception system 110 and a processing unit 120. The perception system 110 is configured as a radar system including a radar sensor. The processing unit 120 is connected to the radar system 110 in order to receive and to process signals from the radar sensor of the radar system 110. The radar sensor of the radar system 110 transmits radar waves to the external environment of the vehicle 100 and receives a part of these radar waves which is reflected by objects in the external environment of the vehicle 100.

The vehicle 100 is located on a road surface 130. The linear extension of the location on the road surface 130 where the vehicle 100 is currently located may also be denoted as a ground plane. The dashed line 132 denotes a plane extending in parallel to the ground plane or road surface 130 at a mounting height 134 of the radar system 110. On the road surface 130, a region of interest 136 is predefined with respect to the current location of the vehicle 100. The region of interest 136 may be located at a distance of about 5 to 10 m in front of the vehicle 100 and may have a lateral extension of approximately 2 m. Alternatively, the region of interest may be defined between other distances with respect to the vehicle 100. The region of interest may also extend from the vehicle 100 up to a certain distance.

The radar system 110 is further configured to determine a distance, i.e. a radial distance with respect of the radar system 110, or a range 138 at which the radar waves transmitted by the radar system 110 are reflected by the road surface 130 within the region of interest 136. In addition, the radar system 110 is configured to determine an elevation angle 140 of the radar waves reflected within the region of interest 136. The elevation angle 140 refers to the road surface 130 or ground plane and is depicted in FIG. 1 in relation to the imaginary parallel plane 132 extending at the height 134 of the radar system 110 with respect to the road surface 130.

In addition, an object 150 is schematically shown in FIG. 1. The object 150 is located in the external environment of the vehicle 100 and is located at an object height 152 with respect to the road surface 130. The radar system 110 is also configured to determine a range and an angle 154 of the object 150 with respect to the radar system 110. The angle 154 may include an elevation angle and an azimuth angle of the object 150 with respect to the radar system 110.

An important task for the combination of the radar system 110 and the processing unit 120 is the determination of the height 152 of the object 150 in order to assess whether the object 150 is potentially dangerous for the vehicle 100. In order to determine the height 152 of the object 150, the elevation angle 154 may be used. However, the elevation angle 154 of the object 150 is determined with respect to the radar system 110, i.e. in a radar coordinate system being centered at the radar system 110. Two axes of the radar coordinate system may extend within the imaginary plane 132 extending in parallel to the road surface 130 at the mounting height 134 of the radar system 110. These two axes are aligned, for example, with a longitudinal axis and a lateral axis of the vehicle 100, respectively.

In order to determine the height 152 of the object 150 with respect to the road surface 130, a spatial transformation is required between the radar coordinate system and a ground coordinate system which has its origin at the road surface 130. In addition, for determining the height 152 of the object 150 with respect to the ground plane or road surface 130 correctly, it is necessary to know the current pitch angle of the radar system 110 relative to the road surface 130.

During an acceleration of the vehicle 100, for example, the front of the vehicle 100 may move upward slightly with respect to the rear of the vehicle. Accordingly, the radar system 110 may have a positive pitch angle 162 with respect to the ground plane or road surface 130 and with respect to the parallel imaginary plane 132. Conversely, during braking maneuvers of the vehicle 100, the front of the vehicle 100 may move downward with respect to the rear of the vehicle 100 such that the radar system 110 may have a negative pitch angle 164 with respect to the road surface 130 and to the imaginary parallel plane 132. The pitch angles 162, 164 are depicted in FIG. 1 by respective small arrows.

Figure 2:
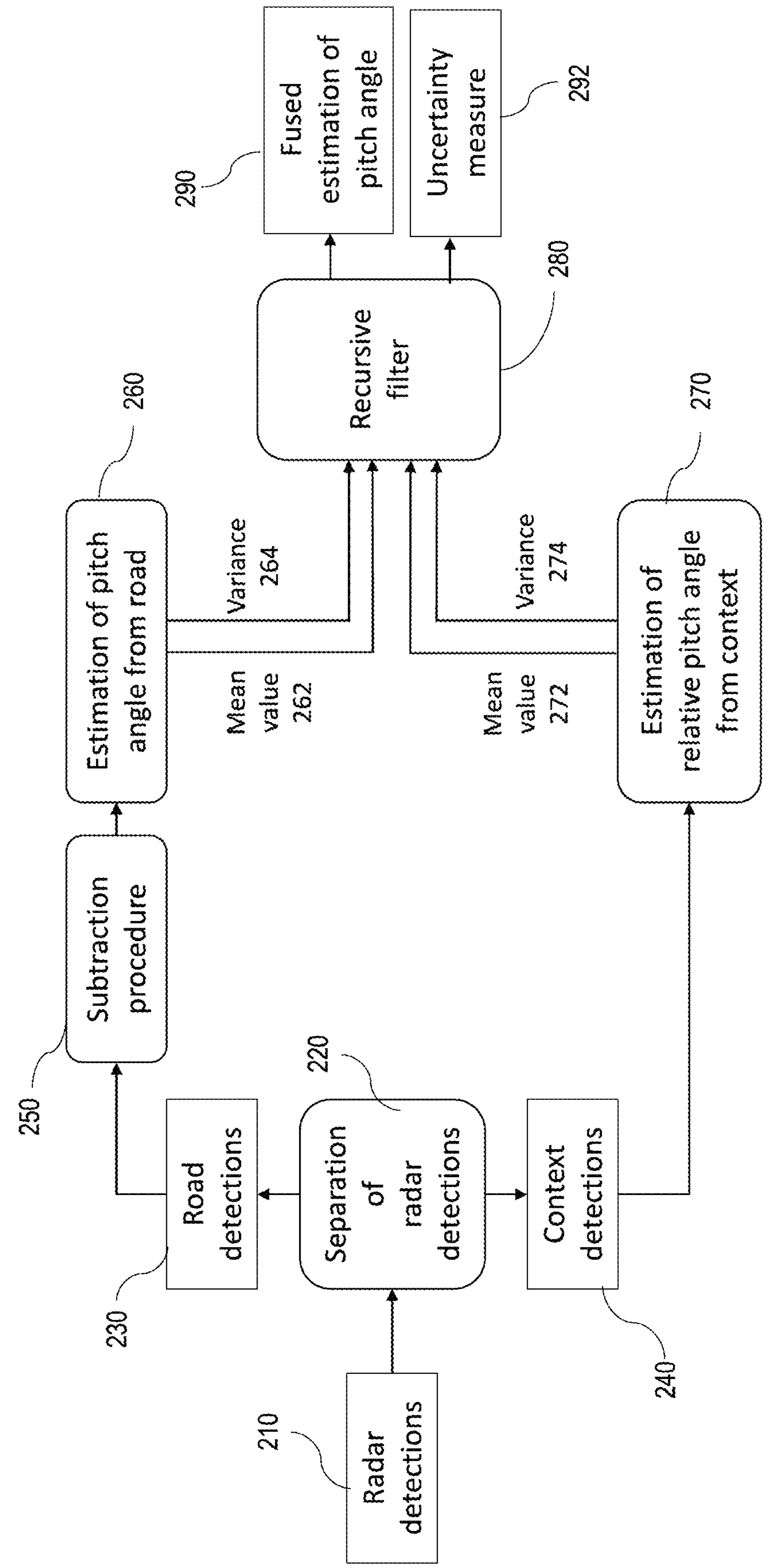
FIG. 2 is an illustration of method steps according to the disclosure.

During driving of the vehicle 100, the pitch angle may change by 2 degrees or even more. Such a pitch angle change may cause an error when determining the height 152 of the object 150 which may be approximately 3.5 m for a range or distance of 100 m of the object 150 with respect to the vehicle 100. Therefore, it is important to have a reliable estimation of the current pitch angle of the radar system 110 during the operation of the vehicle 100 at every time step. For dynamically determining the pitch angle 162, 164 of the radar system 110 in a reliable manner, a method according to disclosure is provided. Steps of this method are schematically depicted in FIG. 2.

The signals received by the radar sensor of the radar system 110 are transformed to points in spherical coordinates, i.e. including a range, an azimuth angle and an elevation angle of a respective reflection of the radar waves. These points are associated with a respective radar intensity and are denoted as radar detections 210 (see FIG. 2). At 220, the radar detections 210 are separated into road detections 230 and context detections 240.

The road detections 230 are generated by the received signals from the predefined area or region of interest 136 (see FIG. 1) of the road surface 130. In contrast, the context detections 240 are generated by signals received from objects like the object 150 (see FIG. 1) which are located at positions being different from the road surface 130, for example. The road detections 230 and the context detections 240 can be distinguished and separated from each other based on their respective range and elevation angle with respect to the radar system 110.

For example, radar detections 210 which are generated at the predefined range of e.g. 5 to 10 m and which have a corresponding elevation angle 140 which fits to the region of interest 136 are regarded as road detections 230, whereas other radar detections 210 providing a range outside the region of interest 138, i.e. smaller than e.g. 9 m or greater than 10 m and having a corresponding elevation and azimuth angle 152 which does not fit to the region of interest 136 are regarded as context detections 240. In addition, the radar cross-section of objects 150 which are not part of the road surface 130 is expected to be much greater than the radar cross-section of a typical road surface 130. In other words, a larger amount of radar energy is usually reflected by stationary objects like the object 150 above the road surface 130 than by an area or region of the road surface 130. Generally, there are different criteria in order to separate the road detections 230 from the context detections 240.

If there is a plurality of N road detections 230 generated by radar reflections from the road surface 130 within the region of interest 136 (see FIG. 1), respective "theoretical" or expected angles are calculated for respective measured ranges $$r_{i,Road}^{M}$$

like the range 138 (see FIG. 1) of the N road detections 230 by applying the known mounting height 134 of the radar system 110 which is denoted by $h_{Radar}$. In detail, the sine of this theoretical angle is given by the ratio of the mounting height $h_{Radar}$ and the respective measured range $$r_{i,Road}^{M},$$

i.e. by $$h_{Radar}/r^M_{i,Road}.$$

The "theoretical angle" of the N road detection 230 corresponds to an expected pitch angle of about 0 degrees, i.e. for a situation in which the longitudinal axis of the vehicle 100 is aligned in parallel with the road surface 130 (see FIG. 1).

The theoretical angles which are determined as described above based on the mounting height 134 of the radar sensor 110 and the range 138 of the road detections 230 are subtracted from respective measured angles $$\theta^M_{i,Road}$$

at 250 which is denoted as subtraction procedure. The N measured angles are determined for the N road detections 230 by standard angle finding procedures known in the field of radar sensors, e.g. as angles from range rate or via more sophisticated procedures using Fourier transforms or an iterative adaptive approach (IAA). For the N road detections 230, a mean value and a variance are calculated for the above-described differences as follows:

$$\hat{\theta}^M_{Road} = \sum_{i=1}^{N}\left(\theta^M_{i,Road} - \sin^{-1}\left(\frac{h_{Radar}}{r^M_{i,Road}}\right)\right)/N \tag{1}$$

$$\mathrm{var}(\theta^M_{Road}) = \sum_{i=1}^{N}\left|\theta^M_{i,Road} - \sin^{-1}\left(\frac{h_{Radar}}{r^M_{i,Road}}\right) - \hat{\theta}^M_{Road}\right|^2/N \tag{2}$$

$$\hat{\theta}^M_{Road}$$

denotes the estimated pitch angle of the radar system 110 relative to the road surface which may be denoted as a primary pitch angle.

The mean value denoted by 262 and the variance denoted by 264 (see FIG. 2) for the estimation of the primary pitch angle based on the road detection 230 are transferred as an input to a recursive filter 280 which will be described in detail below.

In some circumstances, the region of interest 136 on the road surface 130 may be blocked for the radar system 110 or may have a low reflectivity for the transmitted radar waves. Therefore, a small amount of road detections 230 is available in this case for the estimation of the mean value 262 and the variance 264 of the pitch angle. Therefore, the variance 264 may strongly increase if a small amount of road detections 230 is available due to a blocked radar system 110 or a low reflectivity of the road surface 130.

Therefore, the context detections 240 are also used for the estimation of a so-called relative pitch angle. The context detections 240 are generated, as already mentioned above, by objects like the object 150 (see FIG. 1) which do not belong to the road surface 130. In detail, a plurality or almost all static objects 150 available in the external environment of the vehicle 100 are considered for determining a respective measured angle $$\theta^M_{i,Context}$$

which may also be determined by standard angle finding procedures as described above for the road detections 230. By calculating the respective range rate or Doppler based on the context radar detection 240 it may be determined whether the respective object 150 is stationary or not.

In a similar manner as for the primary pitch angle determined based on the road detections 230, a mean value 272 and a variance 274 are calculated based on a plurality of L context detections 240 as follows:

$$\hat{\theta}^M_{Context} = \sum_{i=1}^{L}\theta^M_{i,Context}/L \tag{3}$$

$$\mathrm{var}(\theta^M_{Road}) = \sum_{i=1}^{L}\left|\theta^M_{i,Context} - \hat{\theta}^M_{Context}\right|^2/L \tag{4}$$

In contrast to the primary pitch angle determined from the road detections 230, the estimated angle provided by the mean value 272 does not provide a correct estimation of an absolute pitch angle since this angle does not refer to the road surface 130 or ground plane. The mean value 272 which is determined based on the context detections 240 also varies over time since it depends on the available stationary objects 150 in the external environment of the vehicle 100.

In order to remove the incorrect absolute angle information from the mean value 272 of the angles determined from the road detections 240, the difference between two consecutive angles which are determined for two different measurement cycles or time steps is calculated as follows:

$$\Delta\theta^M_{Context}(t) = \theta^M_{Context}(t) - \theta^M_{Context}(t-1) \tag{5}$$

This angle difference is denoted as a relative pitch angle. Besides, a pitch angle rate may be determined by dividing the angle difference from equation (5) by the corresponding time interval. In summary, the mean value 272 and the corresponding variance 274 of the measured angle from context on which the relative pitch angle relies are transferred to recursive filter 280.

The recursive filter 280 is configured as a Kalman filter for the present embodiment. For the Kalman filter, a state space x is defined as follows:

$$x = \begin{pmatrix} \theta^S_{Road} \\ \Delta\theta^S_{Context} \end{pmatrix}, \tag{6}$$

wherein $$\theta^S_{Road}$$

is an estimation of a final pitch angle with respect to the road surface 130, and $$\Delta\theta^S_{Context}$$

is the relative pitch angle as described above.

In addition, a measurement vector of the Kalman filter is defined by $$z = \begin{pmatrix} \theta^M_{Road} \\ \Delta\theta^M_{Context} \end{pmatrix}, \quad (7)$$

wherein $$\theta^M_{Road}$$

is the measured or primary pitch angle relative to the road, and $$\Delta\theta^M_{Context}$$

is relative pitch angle given by the difference between two consecutive estimations from the context detections 240.

The state transition model or predictor step of the Kalman filter is given by the following matrix which combines the pitch angle estimation based on the road detections 230 which is estimated at 250, and the relative pitch angles or pitch angle rates which are based on the context detections 240 and which are estimated at 270. The matrix is given by:

$$A = \begin{pmatrix} 1 & 1 \\ 0 & 1 \end{pmatrix} \quad (8)$$

Finally, the observation model of the Kalman filter is given by the identity matrix:

$$H = \begin{pmatrix} 1 & 0 \\ 0 & 1 \end{pmatrix} \quad (9)$$

The output of the recursive filter 280 or Kalman filter includes a final pitch angle 290 which is given as a fused estimation of the pitch angle based on the road and context detections 230, 240. In addition, the output of the recursive filter 280 or Kalman filter includes a confidence value or uncertainty measure 292 which is based at least partly on the variances 264, 274.

Figure 3:
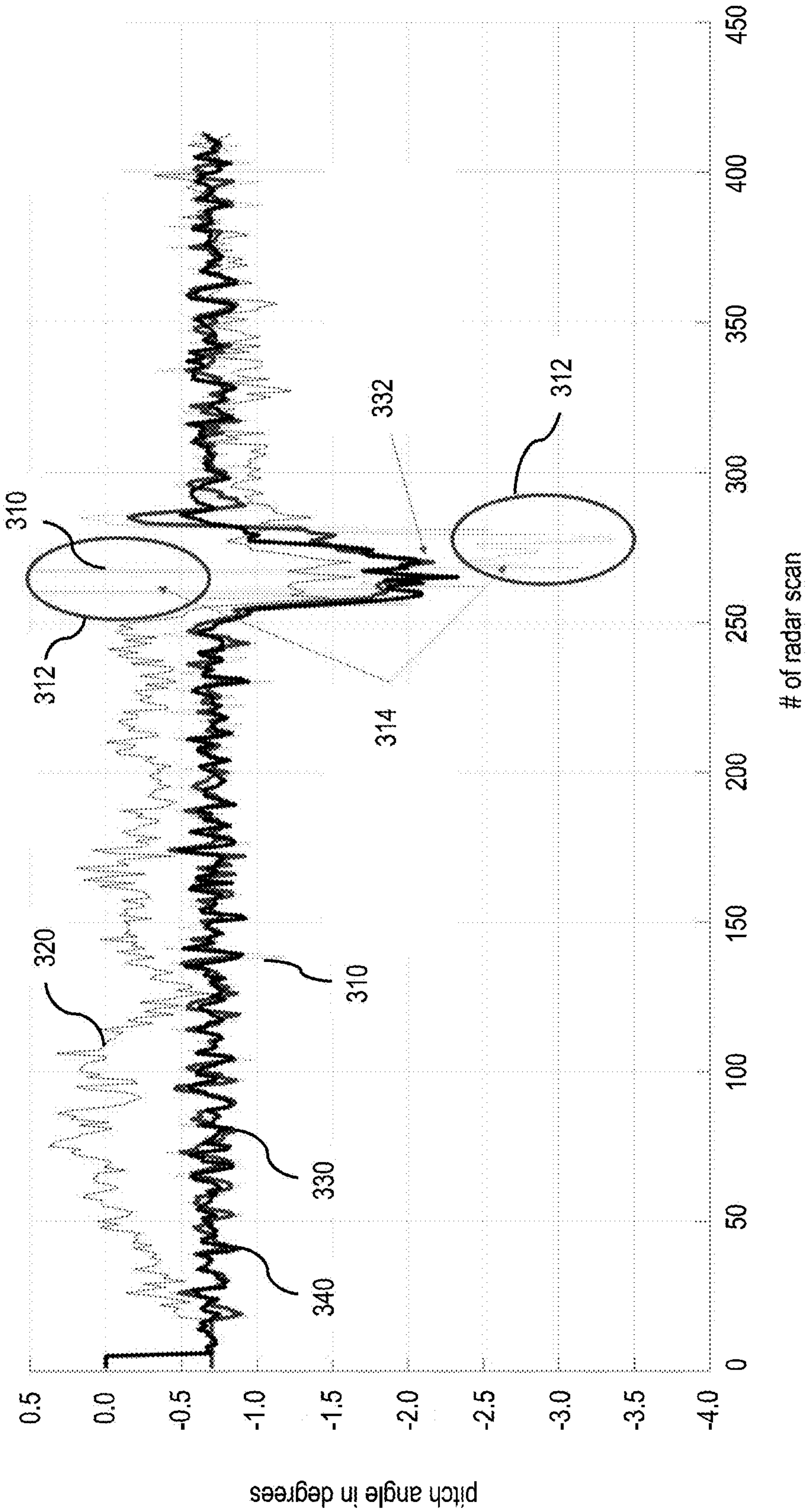
FIG. 3 is an illustration of a diagram illustrating a dynamic determination of a pitch angle.

In FIG. 3, a diagram is depicted which shows different curves for the pitch angle of the radar system 110 with respect to the road surface 130 (see FIG. 1). The respective pitch angle is represented in degrees on the y-axis over a consecutive row of about 400 radar scans on the x-axis which therefore corresponds to a time axis. That is, the curves of the pitch angle are depicted over time in FIG. 3.

The diagram includes a curve 310 which represents the primary pitch angle, i.e. the pitch angle estimated based on the road detections 230 as the result of block 260 in FIG. 2, i.e. according to formula (1). As emphasized by the ellipses 312, the curve 310 includes strong outliers 314 in the region after the scan number 250. As described above, these outliers may be caused by a low reflectivity of the road surface 130 (see FIG. 1) or by a partial blocking of the region of interest 136 with respect to the radar system 110.

In addition, the curve 320 represents the respective mean values of angle detections over all available stationary objects 150 in the external environment of the vehicle 100. These mean values for the curve 320 are estimated in block 270 of FIG. 2 based on the context detections 240 according to formula (3). As can be recognized in FIG. 3, the angle 320 as determined by the context detections 240 has an offset with respect to the pitch angle 310 as determined from the road detections 230. In addition, the angle 320 determined from context detections 240 varies over time in a much stronger manner than the pitch angle 310 determined from the road detections 230.

The curve 310 for the primary pitch angle determined from road detections 230 has a quite constant value of about −0.7 degrees for most of the radar scans, i.e. for most of the time up to scan 250 and after scan 300. Between the scan 250 and 300, however, the variance of the pitch angle determined from the road detections 320 strongly increases, wherein this variance is calculated according to formula (4).

Due to this increase of the variance for the estimation of the primary pitch angle from the road detections 230, the recursive filter 280 configured as a Kalman filter compensates the unreliable estimation of primary pitch angle from road detections 230 by the context-based pitch angle estimation as provided by block 270 in FIG. 2. In other words, the Kalman filter reduces the weight for the mean value 262 representing the estimation of the primary pitch angle from the road detections 230 and increases the weight for the context-based estimation of the pitch angle as provided via the mean value 272 generated by block 270 as the relative pitch angle Δθ. This compensation is denoted by 332 in FIG. 3

The result of the recursive filter 280 is shown in FIG. 3 as curve 330. This curve 330 represents the final pitch angle or fused estimation 290 (see FIG. 2) of the pitch angle which is provided as an output of the recursive filter 280 together with a confidence value or uncertainty measure 292. As mentioned above, the uncertainty measure 292 for the pitch angle is determined based on the variance 264 and the variance 274 which are input to the recursive filter 280 together with the respective mean values 262, 272.

In addition, the curve 340 as shown in FIG. 3 represents a ground truth provided for the pitch angle of the radar system 110. As can be recognized in FIG. 3, the curve 330 being the output of the recursive filter 280 shows a good agreement with the curve 340 for the ground truth. In detail, the outliers 340 of the curve 310 are removed from the curve 330 for the pitch angle which is output by the recursive filter 280 by additionally considering the context detections 240. In summary, a reliable and stable estimation of the pitch angle of the radar system 110 with respect to the road surface 130 is provided by the method according to the disclosure.

Figure 4:
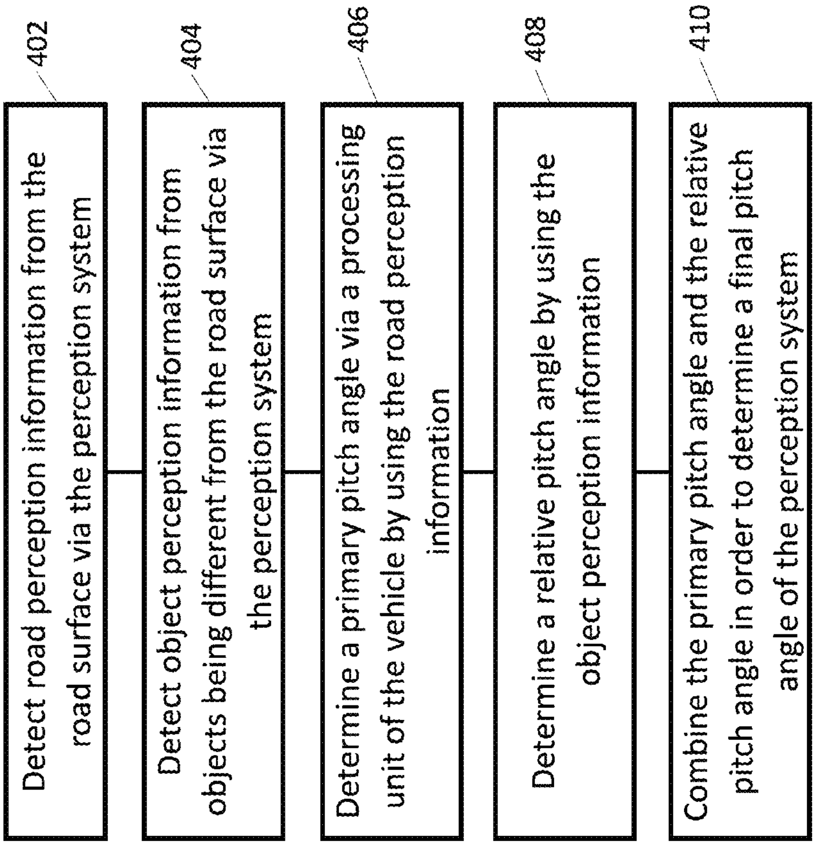
FIG. 4 is a flow diagram illustrating a method for determining a pitch angle of perception system of a vehicle with respect to a road surface according to various embodiments.

FIG. 4 shows a flow diagram 400 illustrating a method for determining a pitch angle of a perception system of a vehicle with respect to a road surface on which the vehicle is located. The perception system may be configured to detect perception information from an external environment of the vehicle.

At 402, road perception information from the road surface may be detected via the perception system. At 404, object perception information from objects being different from the road surface may be detected via the perception system. At 406, a primary pitch angle may be determined via a processing unit of the vehicle by using the road perception information. At 408, a relative pitch angle may be determined via the processing unit by using the object perception information. At 410, the primary pitch angle and the relative pitch angle may be combined via the processing unit in order to determine a final pitch angle of the perception system.

According to various embodiments, the primary pitch angle and the relative pitch angle may be combined via a recursive filter.

According to various embodiments, a first variance may be calculated for the primary pitch angle, a second variance may be calculated for a raw pitch angle which may be determined based on the object perception information and which may be used for determining the relative pitch angle, and an input for the recursive filter may include the first variance and the second variance.

According to various embodiments, a confidence value may be determined for the final pitch angle by applying the recursive filter.

According to various embodiments, the recursive filter may include a Kalman filter, and a measurement vector of the Kalman filter may include the primary pitch angle and the relative pitch angle.

According to various embodiments, a region of interest may be predefined on the road surface in front of the vehicle, and the road perception information may be determined by using detections received from the region of interest only via the perception system.

According to various embodiments, the perception system may include a radar system, the road perception information may include road radar detections received from the road surface, and the object perception information may include object radar detections received from stationary objects being different from the road surface in the external environment of the vehicle.

According to various embodiments, a respective measured angle may be determined for each of the road radar detections within a region of interest on the road surface, a respective theoretical or expected angle may be determined based on a respective measured range of each of the road radar detections with respect to the radar system and based on a mounting height of the radar system, and the primary pitch angle may be determined based on at least one difference between the respective measured angle and the respective theoretical angle.

According to various embodiments, the primary pitch angle may be determined by estimating a mean value of respective differences between the measured angles and the theoretical angles determined for a plurality of road radar detections for the region of interest on the road surface, and the relative pitch angle may be determined based on at least one mean value of raw pitch angles determined for a plurality of object radar detections from the stationary objects.

According to various embodiments, the relative pitch angle may be determined by a difference of at least two mean values of raw pitch angles determined for at least two different time steps.

Each of the steps 402, 404, 406, 408, 410 and the further steps described above may be performed by computer hardware components.

Figure 5:
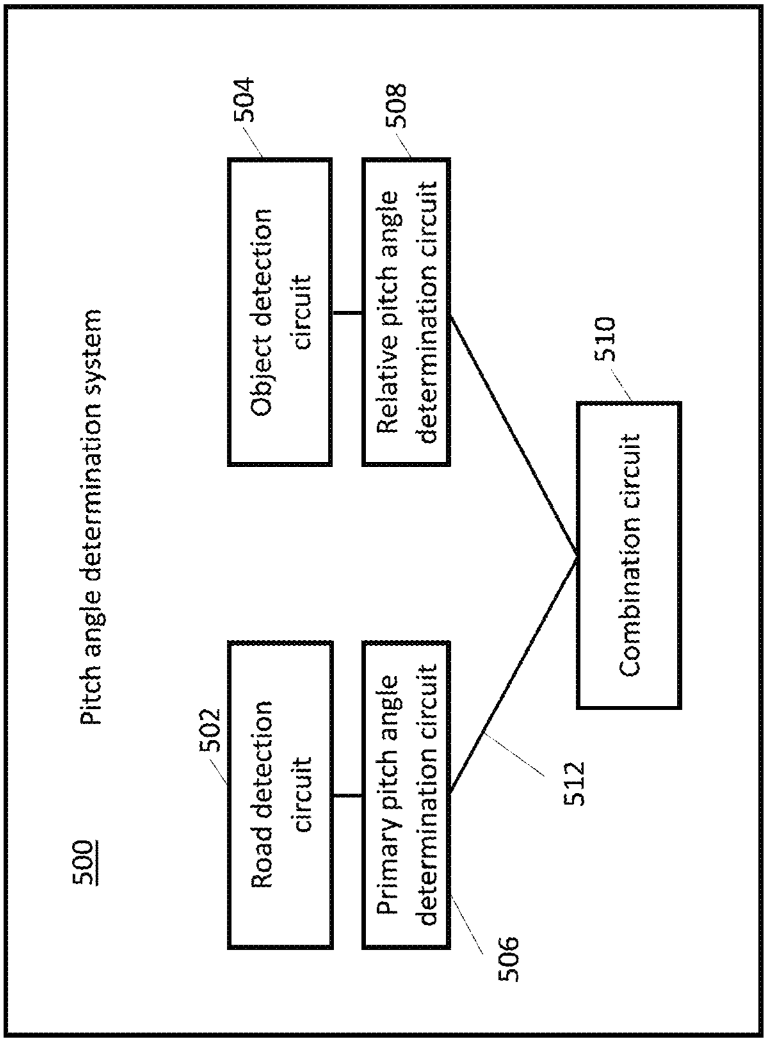
FIG. 5 is an illustration of a system according to various embodiments.

FIG. 5 shows a pitch angle determination system 500 according to various embodiments. The pitch angle determination system 500 may include a road detection circuit 502, an object detection circuit 504, a primary pitch angle determination circuit 506, a relative pitch angle determination circuit 508, and a combination circuit 510.

The road detection circuit 502 may be configured to detect road perception information from the road surface via a perception system of the vehicle.

The object detection circuit 504 may be configured to detect object perception information from objects being different from the road surface via the perception system.

The primary pitch angle determination circuit 506 may be configured to determine a primary pitch angle via a processing unit of the vehicle by using the road perception information.

The relative pitch angle determination circuit 508 may be configured to determine a relative pitch angle via the processing unit by using the object perception information.

The combination circuit 510 may be configured to combine the primary pitch angle and the relative pitch angle via the processing unit in order to determine a final pitch angle of the perception system.

The road detection circuit 502, the object detection circuit 504, the primary pitch angle determination circuit 506, the relative pitch angle determination circuit 508, and the combination circuit 510 may be coupled to each other, e.g. via an electrical connection 512, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 6:
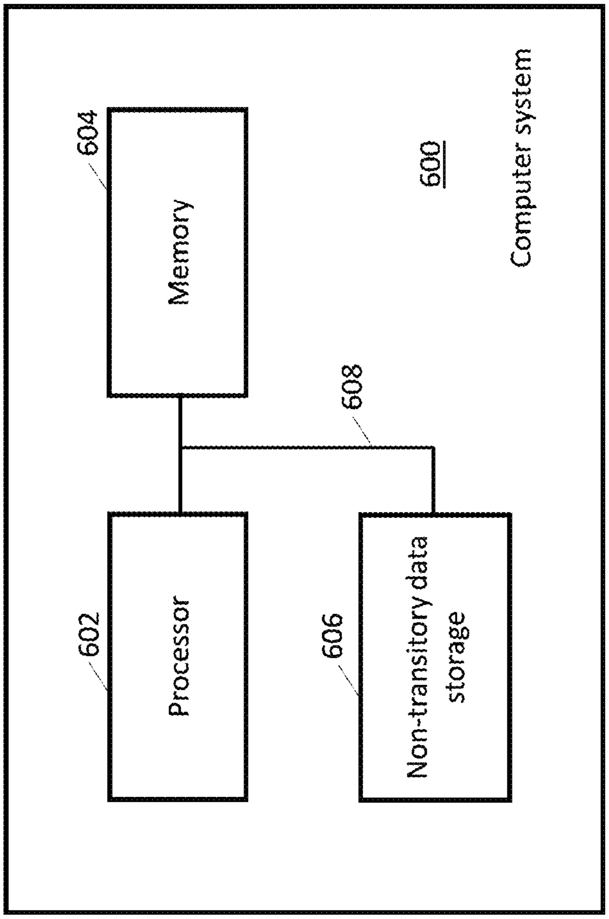
FIG. 6 is an illustration of a computer system with a plurality of computer hardware components configured to carry out steps of a computer implemented method as described herein.

FIG. 6 shows a computer system 600 with a plurality of computer hardware components configured to carry out steps of a computer implemented method for predicting respective trajectories of a plurality of road users according to various embodiments. The computer system 600 may include a processor 602, a memory 604, and a non-transitory data storage 606.

The processor 602 may carry out instructions provided in the memory 604. The non-transitory data storage 606 may store a computer program, including the instructions that may be transferred to the memory 604 and then executed by the processor 602.

The processor 602, the memory 604, and the non-transitory data storage 606 may be coupled with each other, e.g. via an electrical connection 608, such as e.g. a cable or a computer bus or via any other suitable electrical connection to exchange electrical signals.

As such, the processor 602, the memory 604 and the non-transitory data storage 606 may represent the road detection circuit 502, the object detection circuit 504, the primary pitch angle determination circuit 506, the relative pitch angle determination circuit 508, and the combination circuit 510, as described above.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the pitch angle determination system 500 and/or for the computer system 600.

REFERENCE NUMERAL LIST

100 vehicle
110 radar system
120 processing unit
130 road surface
132 imaginary plane parallel to the road surface
134 mounting height of the radar system
136 region of interest on the road surface
138 range or distance of the region of interest
140 elevation angle of the region of interest
150 object

152 object height with respect to the road surface
154 elevation angle of the object
210 radar detections
220 separation of radar detections
230 road detections
240 context detections from objects
250 subtraction procedure
260 estimation of pitch angle from road detections
262 mean value for pitch angle from road detections
264 variance for the pitch angle from road detections
270 estimation of relative pitch angle from context detections
272 mean value for the relative pitch angle
274 variance for the relative pitch angle
280 recursive filter
290 final pitch angle
292 uncertainty measure
310 curve for pitch angle estimated from road detection
312 ellipse for emphasizing outliers
314 outliers
320 curve for the relative pitch angle determined from context detections
330 final pitch angle as output of the recursive filter
332 compensation of outliers by the recursive filter
340 ground truth for the pitch angle
400 flow diagram illustrating a method for determining a pitch angle of a perception system of a vehicle with respect to a road surface
402 step of detecting road perception information from the road surface via the perception system
404 step of detecting, via the perception system, object perception information from objects being different from the road surface
406 step of determining a primary pitch angle via a processing unit of the vehicle by using the road perception information
408 step of determining a relative pitch angle via the processing unit by using the object perception information
410 step of combining the primary pitch angle and the relative pitch angle via the processing unit in order to determine a final pitch angle of the perception system
500 pitch angle determination system
502 road detection circuit
504 object detection circuit
506 primary pitch angle determination circuit
508 relative pitch angle determination circuit
510 combination circuit
512 connection
600 computer system according to various embodiments
602 processor
604 memory
606 non-transitory data storage
608 connection

What is claimed is:

1. A computer implemented method for determining a pitch angle of a perception system of a vehicle with respect to a road surface on which the vehicle is located, wherein the perception system is configured to detect perception information from an external environment of the vehicle, the method comprising:
- detecting road perception information from the road surface via the perception system,
- detecting, via the perception system, object perception information from objects being different from the road surface, and via a processing unit of the vehicle, performing the steps of:
- determining a primary pitch angle by using the road perception information,
- determining a relative pitch angle by using the object perception information, and
- combining the primary pitch angle and the relative pitch angle in order to determine a final pitch angle of the perception system;

wherein:
the primary pitch angle and the relative pitch angle are combined via a recursive filter;
a first variance is calculated for the primary pitch angle;
a second variance is calculated for a raw pitch angle which is determined based on the object perception information and which is used for determining the relative pitch angle; and
an input for the recursive filter includes the first variance and the second variance.

2. The method according to claim 1, wherein:
a confidence value is determined for the final pitch angle by applying the recursive filter.

3. The method according to claim 1, wherein:
the recursive filter includes a Kalman filter, and
a measurement vector of the Kalman filter includes the primary pitch angle and the relative pitch angle.

4. The method according to claim 1, wherein:
a region of interest is predefined on the road surface in front of the vehicle, and
the road perception information is determined by using detections received from the region of interest only via the perception system.

5. The method according to claim 1, wherein:
the perception system includes a radar system,
the road perception information includes road radar detections received from the road surface, and
the object perception information includes object radar detections received from stationary objects being different from the road surface in the external environment of the vehicle.

6. The method according to claim 5, wherein:
a respective measured angle is determined for each of the road radar detections within a region of interest on the road surface,
a respective theoretical angle is determined based on a respective measured range of each of the road radar detections with respect to the radar system and based on a mounting height of the radar system, and
the primary pitch angle is determined based on at least one difference between the respective measured angle and the respective theoretical angle.

7. The method according to claim 6, wherein:
the primary pitch angle is determined by estimating a mean value of respective differences between the measured angles and the theoretical angles determined for a plurality of road radar detections for the region of interest on the road surface, and
the relative pitch angle is determined based on at least one mean value of raw pitch angles determined for a plurality of object radar detections from the stationary objects.

8. The method according to claim 7, wherein:
the relative pitch angle is determined by a difference of at least two mean values of raw pitch angles determined for at least two different time steps.

9. A computer system configured to carry out the computer implemented method of claim 1 and to:

receive the road perception information and the object perception information from the perception system of the vehicle.

10. A vehicle comprising the computer system according to claim 9.

11. The vehicle according to claim 10, wherein:

the perception system includes a radar system, and the radar system includes a front radar sensor which is configured to provide the road perception information and the object perception information.

12. The vehicle according to claim 10, further comprising:

a control unit configured to receive the final pitch angle from the computer system and configured to apply the final pitch angle when determining a height of an object located in the external environment of the vehicle.

13. A non-transitory computer readable medium comprising instructions for carrying out the computer implemented method of claim 1.

* * * * *